(12) United States Patent
Beasley et al.

(10) Patent No.: US 10,591,207 B2
(45) Date of Patent: Mar. 17, 2020

(54) AUTOMATED AND PREDICTIVE MONITORING OF PERISHABLE GOOD PARAMETERS THROUGHOUT A COLD CHAIN DISTRIBUTION SYSTEM

(71) Applicant: Carrier Corporation, Palm Beach Gardens, FL (US)

(72) Inventors: Marc Beasley, Beverly, MA (US); Jeffrey Allen Leshuk, Davis, CA (US); Mark E. Cywilko, Jamesville, NY (US); Murat Yasar, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/085,747

(22) PCT Filed: Mar. 16, 2017

(86) PCT No.: PCT/US2017/022740
§ 371 (c)(1),
(2) Date: Sep. 17, 2018

(87) PCT Pub. No.: WO2017/161134
PCT Pub. Date: Sep. 21, 2017

(65) Prior Publication Data
US 2019/0049172 A1    Feb. 14, 2019

Related U.S. Application Data

(60) Provisional application No. 62/310,385, filed on Mar. 18, 2016.

(51) Int. Cl.
*F25D 29/00* (2006.01)
*B60P 3/20* (2006.01)
(Continued)

(52) U.S. Cl.
CPC ............... *F25D 29/00* (2013.01); *B60P 3/20* (2013.01); *F25D 29/003* (2013.01); *G06Q 50/30* (2013.01); *G08G 1/13* (2013.01); *F25D 2700/16* (2013.01)

(58) Field of Classification Search
CPC .......... F25D 29/00; F25D 29/003; B60P 3/20; G06Q 50/30; G08G 1/13
See application file for complete search history.

(56) References Cited

U.S. PATENT DOCUMENTS 6,094,642 A    7/2000 Stephenson et al.
7,376,601 B1   5/2008 Aldridge
(Continued)

FOREIGN PATENT DOCUMENTS

CN    103136642 A    6/2013
CN    202975779 U    6/2013
(Continued)

OTHER PUBLICATIONS

Cold Chain View—Looking Into Product Quality and Integrity in the Cold Chain, Aug. 19, 2015 [retrieved on Jan. 20, 2016 (Jan. 20, 2016)]. Retrieved from the internet:,URL:https://dyzle.wordpress. com/tag/logistics/.

(Continued)

*Primary Examiner* — Curtis B Odom
(74) *Attorney, Agent, or Firm* — Cantor Colburn LLP

(57) ABSTRACT

A system for monitoring goods within a distribution chain is provided. The system includes a storage device to store parameters associated with the goods of a distribution chain, at least one of the parameters being received from a transport refrigeration system. The storage device storing historical parameters for other goods. Also included is a parameter management system coupled to the storage device. The parameter management system including: a predictive mod- (Continued)

ule to determine predicted parameters; and a meshing module to determine output parameters by combining the predicted parameters and the parameters.

20 Claims, 2 Drawing Sheets

(51) Int. Cl.
G06Q 50/30 (2012.01)
G08G 1/13 (2006.01)

(56) References Cited

U.S. PATENT DOCUMENTS

| 8,249,954 | B2 | 8/2012 | Dolan et al. | |
|---|---|---|---|---|
| 8,534,545 | B2 | 9/2013 | Nishiguchi et al. | |
| 8,881,540 | B1 | 11/2014 | Barakat et al. | |
| 9,087,333 | B2 | 7/2015 | Kim et al. | |
| 2006/0161392 | A1 | 7/2006 | Sholl et al. | |
| 2010/0271184 | A1* | 10/2010 | Burchell | G01K 1/024 340/10.1 |
| 2011/0215948 | A1 | 9/2011 | Borgerson et al. | |
| 2012/0000212 | A1 | 1/2012 | Sanders et al. | |
| 2013/0245991 | A1 | 9/2013 | Kriss | |
| 2013/0271290 | A1* | 10/2013 | Saenz | G05D 27/02 340/870.07 |
| 2015/0039529 | A1 | 2/2015 | Barakat | |
| 2015/0046364 | A1 | 2/2015 | Kriss | |
| 2017/0185957 | A1* | 6/2017 | Kilmer | H04Q 9/00 |

FOREIGN PATENT DOCUMENTS

| CN | 104463532 A | 3/2015 |
|---|---|---|
| CN | 105096073 A | 11/2015 |
| EP | 2604956 A1 | 6/2013 |
| WO | 2013148290 A1 | 10/2013 |
| WO | 20151171961 A1 | 11/2015 |

OTHER PUBLICATIONS

Fourtec Overview—Comprehensive Data Acquisition Solutions, 2015 [retrieved on Jan. 20, 2016 (Jan. 20, 2016)]. Retrieved from the internet:,URL:http://fourtec.com/download/get/fourtec_overview_.

Inventory of Fugure Capabilities of Internet to Meet Future Long and Short Term Needs of the Food Sector, Mar. 31, 2011 [retrieved on Jan. 20, 2016 (Jan. 20, 2016)]. Retrieved from the internet:,URL:http://www.smartagrifood.eu/sites/default/files/content-fil.

Notification of Transmittal of the International Search Report and the Written Opinion of the International Searching Authority, or the Declaration for International Application No. PCT/US2017/022740; Report dated May 22, 2017; Report Received Date: May 26, 2017, 13 pages.

* cited by examiner

AUTOMATED AND PREDICTIVE MONITORING OF PERISHABLE GOOD PARAMETERS THROUGHOUT A COLD CHAIN DISTRIBUTION SYSTEM

BACKGROUND OF THE DISCLOSURE

The embodiments disclosed herein generally relate to cold chain distribution systems, and more specifically to an apparatus and a method for monitoring perishable goods within a cold chain distribution system.

Typically, cold chain distribution systems are used to transport and distribute perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

Consumers are becoming increasingly concerned with the origin of the product they are purchasing, as well as details regarding the journey the product took. This concept is often referred to as farm-to-fork. It is often difficult to track the entire journey of a single product from farm-to-fork as it may change hands several times along the route. Improved systems, particularly improved tracking and prediction systems would provide benefits to the industry.

BRIEF DESCRIPTION OF THE DISCLOSURE

According to one embodiment, a system for monitoring goods within a distribution chain is provided. The system includes a storage device to store parameters associated with the goods of a distribution chain, at least one of the parameters being received from a transport refrigeration system. The storage device storing historical parameters for other goods. Also included is a parameter management system coupled to the storage device. The parameter management system including: a predictive module to determine predicted parameters; and a meshing module to determine output parameters by combining the predicted parameters and the parameters.

In addition to one or more of the features described above, or as an alternative, further embodiments of the system may include that the output parameters are accessible via a user device.

In addition to one or more of the features described above, or as an alternative, further embodiments of the system may include that the output parameters are sent to a user device.

In addition to one or more of the features described above, or as an alternative, further embodiments of the system may include that the output parameters are configured as at least one of a map displaying time-based locations of the goods along with the output parameters at the time-based locations and a data table of output parameters.

In addition to one or more of the features described above, or as an alternative, further embodiments of the system may include the parameters include at least one of temperature, pressure, vibration, humidity, and light exposure.

In addition to one or more of the features described above, or as an alternative, further embodiments of the system may include that the parameters include at least one time-based location of the goods.

In addition to one or more of the features described above, or as an alternative, further embodiments of the system may include that the parameters include weather data experienced by the goods.

In addition to one or more of the features described above, or as an alternative, further embodiments of the system may include that the parameters include quality inspections of the goods.

In addition to one or more of the features described above, or as an alternative, further embodiments of the system may include that the parameters include manually entered data.

According to another embodiment, a method of monitoring goods within a distribution chain, the method is provided. The method includes storing, using a storage device, parameters associated with the goods of a distribution chain, at least one of the parameters being received from a transport refrigeration system. The storage device storing historical parameters for other goods. The method also includes analyzing, using a parameter management system, the parameters, the parameter management system coupled to the storage device, the parameter management system including: a predictive module to determine predicted parameters; and a meshing module to determine output parameters by combining the predicted parameters and the parameters.

In addition to one or more of the features described above, or as an alternative, further embodiments of the method may include accessing the output parameters via a user device.

In addition to one or more of the features described above, or as an alternative, further embodiments of the method may include receiving the output parameters via a user device.

In addition to one or more of the features described above, or as an alternative, further embodiments of the method may include displaying the output parameters as at least one of a map showing time-based locations of the goods along with the output parameters at the time-based locations and a data table of output parameters.

In addition to one or more of the features described above, or as an alternative, further embodiments of the method may include that the parameters include at least one of temperature, pressure, vibration, humidity, and light exposure.

In addition to one or more of the features described above, or as an alternative, further embodiments of the method may include that the parameters include at least one time-based location of the good.

In addition to one or more of the features described above, or as an alternative, further embodiments of the method may include that the parameters include weather data experienced by the goods.

In addition to one or more of the features described above, or as an alternative, further embodiments of the method may include that the parameters include quality inspections of the goods.

In addition to one or more of the features described above, or as an alternative, further embodiments of the method may include that the parameters include manually entered data.

Other aspects, features, and techniques of the invention will become more apparent from the following description taken in conjunction with the drawings.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
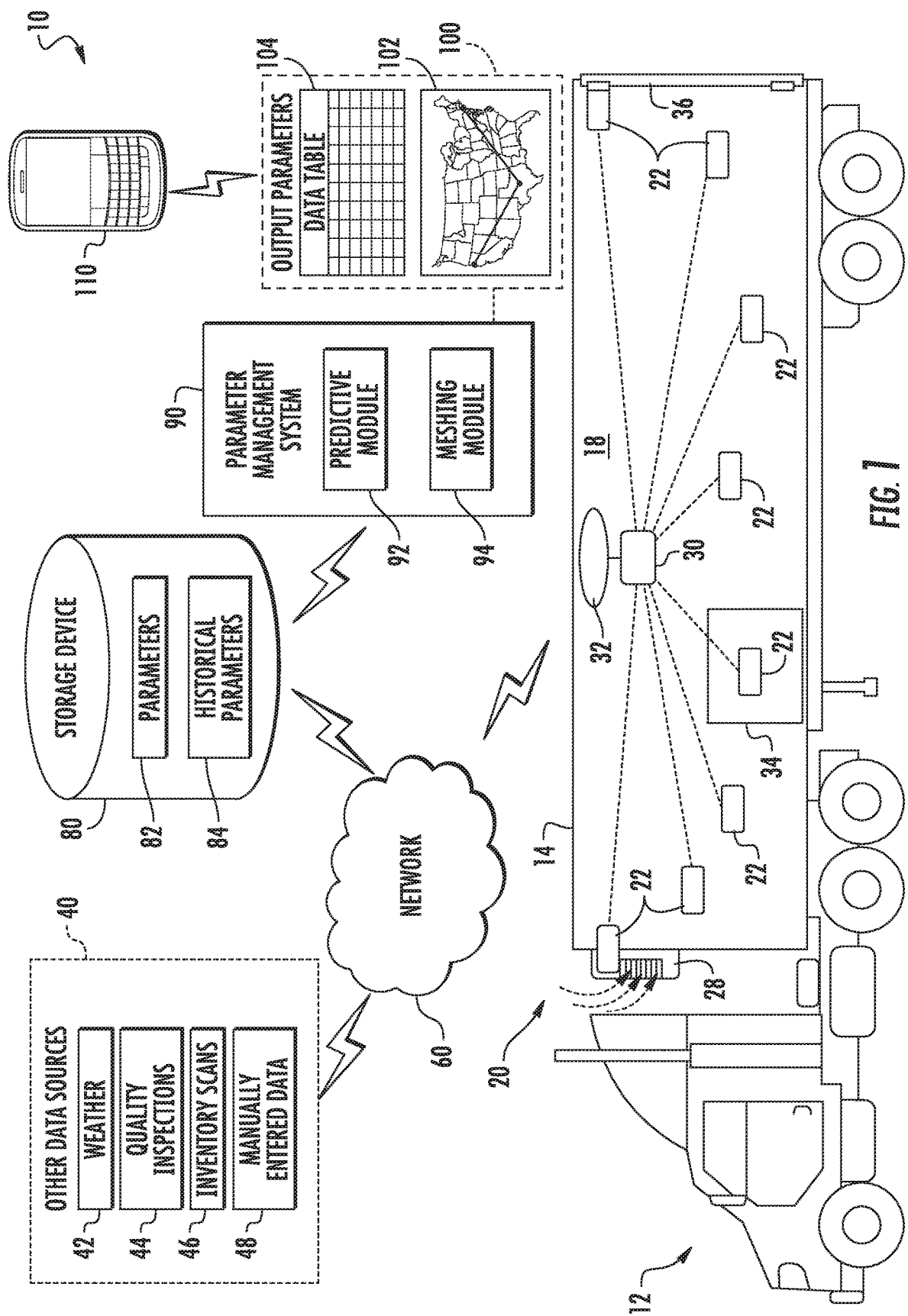
FIG. 1 illustrates a schematic view of a system for monitoring parameters for use in a cold chain distribution system, according to an embodiment of the present disclosure.
Figure 2:
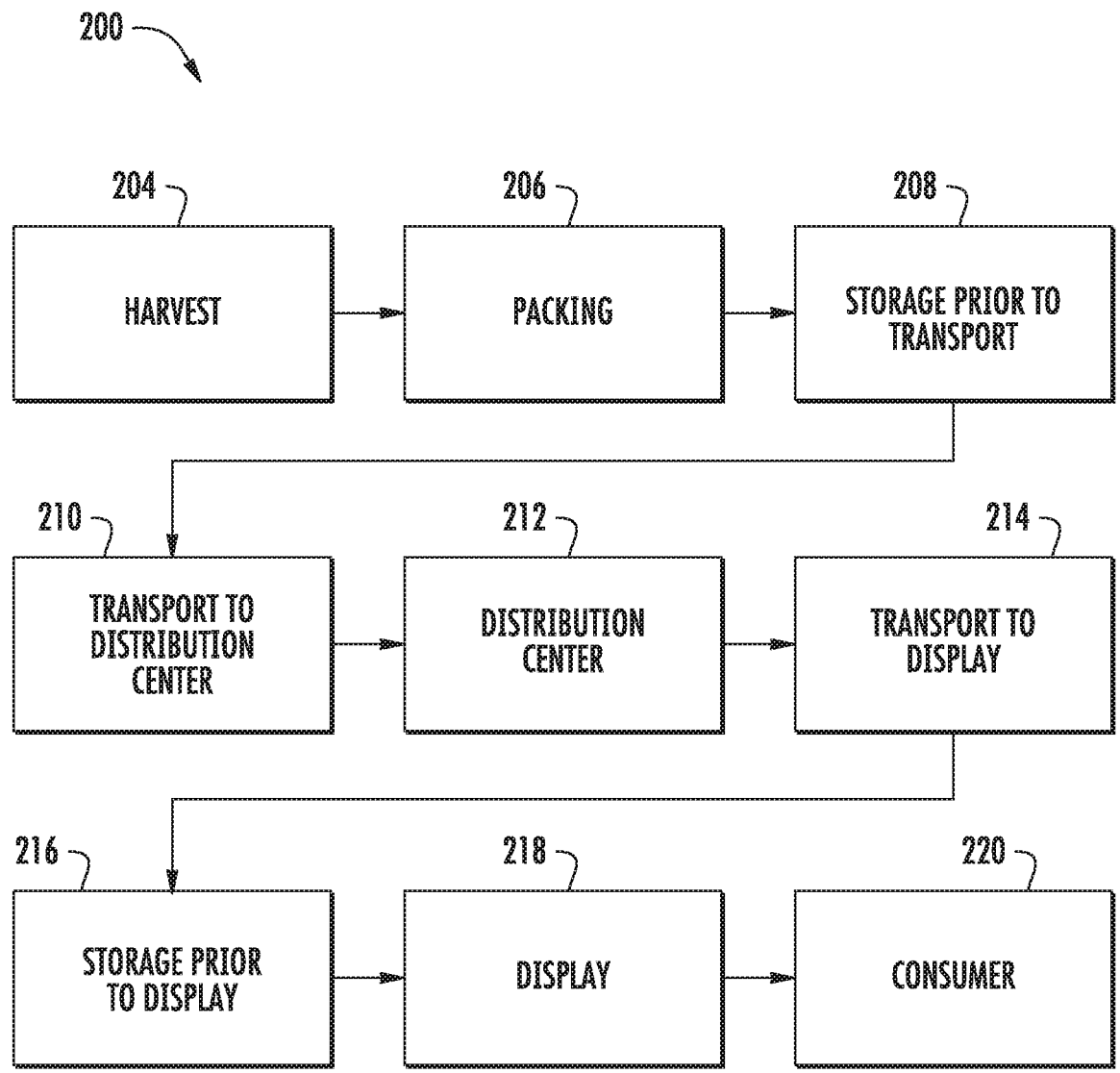
FIG. 2 illustrates a schematic view a cold chain distribution system that may incorporate embodiments of the present disclosure.

Referring now to the drawings, FIG. 1 illustrates a schematic view of a system 10 for monitoring parameters for use in a cold chain distribution system, according to an embodiment of the present disclosure. FIG. 2 illustrates a schematic view a cold chain distribution system 200 that may incorporate embodiments of the present disclosure. Typically, transport refrigeration systems 20 are used to transport and distribute perishable goods and environmentally sensitive goods (herein referred to as perishable goods 34). In the illustrated embodiment, a transport refrigeration system 20 includes an environmentally controlled container 14, a transport refrigeration unit 28 and perishable goods 34. The container 14 may be pulled by a tractor 12. It is understood that embodiments described herein may be applied to shipping containers that are shipped by rail, sea, or any other suitable container, without use of a tractor 12. The container 14 may define an interior compartment 18. It is also understood that embodiments described herein may be applied to shipping goods that are not perishable.

In the illustrated embodiment, the transport refrigeration unit 28 is associated with a container 14 to provide desired environmental parameters, such as, for example temperature, pressure, humidity, carbon dioxide, ethylene, ozone, light exposure, vibration exposure, and other conditions to the interior compartment 18. In further embodiments, the transport refrigeration unit 28 is a refrigeration system capable of providing a desired temperature and humidity range. The perishable goods 34 may include but are not limited to fruits, vegetables, grains, beans, nuts, eggs, dairy, seed, flowers, meat, poultry, fish, ice, blood, pharmaceuticals, or any other suitable cargo requiring cold chain transport.

In the illustrated embodiment, the transport refrigeration system 20 includes sensors 22. The sensors 22 may be utilized to monitor parameters 82 internal and external to the container 14. The parameters 82 monitored by the sensors 22 may include but are not limited to temperature, pressure, humidity, carbon dioxide, ethylene, ozone, light exposure, vibrations, and other conditions in the interior compartment 18. Accordingly, suitable sensors 22 are utilized to monitor the desired parameters. Advantageously, sensors 22 may be selected for certain applications depending on the type of perishable goods 34 to be monitored and the corresponding environmental sensitivities. In an embodiment, temperatures are monitored. As seen in FIG. 1, the sensors 22 may be placed directly on the perishable goods 34.

Further, as in the illustrated embodiment, sensors 22 may be used to monitor various parameters 82 of the transport refrigeration system 20. These sensors 22 may be placed in a variety of locations including but not limited to on the transport refrigeration unit 28, on a door 36 of the container 14 and throughout the interior compartment 18. The sensors 22 may be placed directly within the transport refrigeration unit 28 to monitor the performance of the transport refrigeration unit 28. Individual components internal to the transport refrigeration unit 28 may also be monitored by sensors 22 to detect performance aspects, such as, for example usage cycles, duration, temperatures and pressure of individual components. As seen, the sensors 22 may also be placed on the door 36 of the container 14 to monitor the position of the door 36. Whether the door 36 is open or closed affects both the temperature of the container 14 and the perishable goods 34. For instance, in hot weather, an open door 36 will allow cooled air to escape from the container 14, causing the temperature of the interior compartment 18 to rise, thus affecting the temperature of the perishable goods 34. Additionally, a global positioning system (GPS) location may also be detected by the sensors 22. The GPS location may help in providing time-based location information for the perishable goods 34 that will help in tracking the travel route and other parameters 82 along that route. For instance, the GPS location may also help in providing information from other data sources 40 regarding weather 42 experienced by the container 14 along the travel route. The local weather 42 affects the temperature of the container 14 and thus may affect the temperature of the perishable goods 34.

As illustrated in FIG. 1, the transport refrigeration system 20 may further include, a controller 30 configured to log a plurality of readings from the sensors 22, known as parameters 82, at a selected sampling rate. The controller 30 may be enclosed within the transport refrigeration unit 28 or separate from the transport refrigeration unit 28 as illustrated. The parameters 82 may further be augmented with time, location stamps or other relevant information. The controller 30 may also include a processor (not shown) and an associated memory (not shown). The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

In an illustrated embodiment, the transport refrigeration system 20 may include a communication module 32 in operative communication with the controller 30 and in wireless operative communication with a network 60. The communication module 32 is configured to transmit the parameters 82 to the network 60 via wireless communication. The wireless communication may be, but is not limited to, radio, microwave, cellular, satellite, or another wireless communication method. The network 60 may be but is not limited to satellite networks, cellular networks, cloud computing network, wide area network, or another type of wireless network. The communication module 32 may include a short range interface, wherein the short range interface includes at least one of: a wired interface, an optical interface, and a short range wireless interface.

Parameters 82 may also be provided by other data sources 40, as illustrated in FIG. 1. These other data sources 40 may be collected at any point throughout the cold chain distribution system 200, which as illustrated in FIG. 2 may include harvest 204, packing 206, storage prior to transport 208, transport to distribution center 210, distribution center 212, transport to display 214, storage prior to display 216, display 218 and consumer 220. These stages are provided for illustrative purposes and a distribution chain may include fewer stages or additional stages, such as, for example a cleaning stage, a processing stage, and additional transportation stages. The other data sources 40 may include, but are not limited to, weather 42, quality inspections 44, inventory scans 46, and manually entered data 48. The weather 42, as discussed above, has an effect on the operation of the transport refrigeration unit 28 by influencing the temperature of the container 14 during transport (e.g., 210 and 214) but the weather 42 also has other influences on the transport refrigeration unit 28. For instance, the weather 42 prior to and at harvest 204 may have an impact on the quality of the perishable goods 34, which may be interesting for a consumer. Moreover, quality inspections 44, similar to the weather 42, may reveal data of the perishable goods 34 relevant to the consumer. For instance, a particular batch of strawberries may have the required sugar content desired by the consumer. Quality inspections 44 may be done by a machine or a human being. Quality inspections 44 performed by a machine may be accomplished using a variety of techniques including but not limited to optical, odor, soundwave, infrared, or physical probe.

Further inventory scans 46, may also reveal parameters 82 about the perishable goods 34 interesting to the consumer and may help in tracking the perishable goods 34. For instance, the inventory scan 46 may reveal the time, day, truck the perishable goods arrived on, which may help pinpoint their source. While the system 10 includes sensors 22 to aid in automation, often times the need for manual data entry is unavoidable. The manually entered data 48 may be input via a variety of devices including but not limited to a cellular phone, tablet, laptop, smartwatch, a desktop computer or any other similar data input device.

Parameters 82 collected throughout each stage of the cold chain distribution system 200 may include environment conditions experienced by the perishable goods 34 such as, for example, temperature, pressure, humidity, carbon dioxide, ethylene, ozone, vibrations, light exposure, weather, time and location. For instance, strawberries may have experienced an excessive shock or were kept at 34° F. during transport. Parameters 82 may further include attributes of the perishable goods 34 such as, for example, temperature, weight, size, sugar content, maturity, grade, ripeness, labeling, and packaging. For instance, strawberries may be packaged in 1 pound clamshells, be a certain weight or grade, be organic, and have certain packaging or labels on the clamshells. Parameters 82 may also include information regarding the operation of the environmental control unit 28, as discussed above. The parameters 82 may further be augmented with time, location stamps or other relevant information.

In the illustrated embodiment, the system 10 further includes a storage device 80 to store parameters 82 associated with the goods of a distribution chain. At least one of the parameters 82 may be received from a transport refrigeration system. As shown, the storage device 80 also stores historical parameters 84. The storage device 80 may be but is not limited to a random access memory (RAM), read only memory (ROM), or other electronic, optical, magnetic or any other computer readable medium.

In the illustrated embodiment, the system 10 further includes a parameter management system 90. As shown, the parameter management system 90 includes a predictive module 92 and a meshing module 94. The parameter management system 90 may also include a processor (not shown) and an associated memory (not shown). The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium. The predictive module 92 and the meshing module 94 may be implemented in software as applications executed by the processor of parameter management system 90.

The predictive module 92 determines predicted parameters of the perishable goods 34 in response to parameters 82 that are missing. The predictive module 92 may detect trends in the parameters 82, to predict probable values to fill in the gaps of missing parameters 82. For instance, along some instances of the cold chain distribution system 200, sensors 22 may not be available; however if the perishable goods 34 are scanned in during an inventory scan 46, information collected from the inventory scan 46, such as the time, date, and truck that carried the perishable goods 26, may help the predictive module 92 determine missing parameters 82. Further, if 99% of the time the historical parameters 84 say that a truck arriving at 4:00 pm on a Tuesday is coming from Farmer Joe's in California carrying strawberries, then the predictive module 92 will use that information to fill in missing parameters 82 regarding that delivery.

The meshing module 94 determines output parameters 100 by combining the predicted parameters and the parameters 82. The output parameters 100 are the parameters 82 that have been recorded on the storage device 80 combined with the predicted parameters filling in the gaps at selected times and locations along the cold chain distribution system 200. The meshing module 94 may create a full data set of output parameters 100 detailing the journey of the perishable goods 34 from harvest 204 to consumer 220.

These output parameters 100 may be accessible via a user device 110 and/or sent directly to a user device 110. The user device 110 may be a device such as, for example, a cellular phone, tablet, laptop, smartwatch, desktop computer or any similar device. The output parameters 100 may be configured as at least one of a map 102 displaying time-based locations of the perishable goods 34 along with the output parameters 100 at the time-based locations and a data table 104 of output parameters 100. The granularity of the output parameters 100 may be adjusted depending on whom is accessing the output parameters 100 via the user device 110. For instance, employees of a cold chain distribution company may have access to more output parameters 100 at a higher granularity than the consumer. The consumer may be able to enter in some information into their user device 110 or scan the bar code of the perishable good 34 and immediately have access to output parameters 100 that detail the entire journey of the perishable good 34 from harvest 204 to consumer 220. For instance, the consumer may be able to see the route the perishable goods 34 had taken from farm-to-fork and the temperature they were kept at throughout that route.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A system for monitoring goods within a distribution chain, the system comprising:
   a storage device to store parameters associated with the goods of a distribution chain, the storage device storing historical parameters for other goods, at least one of the parameters being received from a transport refrigeration system;
   a parameter management system coupled to the storage device, the parameter management system including:
   a predictive module to determine parameters that are missing, detect trends in the parameters, and determine predicted parameters to fill gaps in response to the missing parameters; and
   a meshing module to determine output parameters by combining the predicted parameters and the parameters.

2. The system of claim 1, wherein:
   the output parameters are accessible via a user device.

3. The system of claim 1, wherein:
   the output parameters are sent to a user device.

4. The system of claim 2, wherein:
   the output parameters are configured as at least one of a map displaying time-based locations of the goods along with the output parameters at the time-based locations and a data table of output parameters.

5. The system of claim 1, wherein:
   the parameters include at least one of temperature, pressure, vibration, humidity, and light exposure.

6. The system of claim 1, wherein:
   the parameters include at least one time-based location of the goods.

7. The system of claim 1, wherein:
   the parameters include weather data experienced by the goods.

8. The system of claim 1, wherein:
   the parameters include quality inspections of the goods.

9. The system of claim 1, wherein:
   the parameters include manually entered data.

10. A method of monitoring goods within a distribution chain, the method comprising:
    storing, using a storage device, parameters associated with the goods of a distribution chain, the storage device storing historical parameters for other goods, at least one of the parameters being received from a transport refrigeration system;
    analyzing, using a parameter management system, the parameters, the parameter management system coupled to the storage device, the parameter management system including:
    a predictive module to determine parameters that are missing, detect trends in the parameters, and determine predicted parameters to fill gaps in response to the missing parameters; and
    a meshing module to determine output parameters by combining the predicted parameters and the parameters.

11. The method of claim 10, further comprising:
    accessing the output parameters via a user device.

12. The method of claim 10, further comprising:
    receiving the output parameters via a user device.

13. The method of claim 11, further comprising:
    displaying the output parameters as at least one of a map showing time-based locations of the goods along with the output parameters at the time-based locations and a data table of output parameters.

14. The method of claim 10, wherein:
    the parameters include at least one of temperature, pressure, vibration, humidity, and light exposure.

15. The method of claim 10, wherein:
    the parameters include at least one time-based location of the good.

16. The method of claim 10, wherein:
    the parameters include weather data experienced by the goods.

17. The method of claim 10, wherein:
    the parameters include quality inspections of the goods.

18. The method of claim 10, wherein:
    the parameters include manually entered data.

19. The system of claim 3, wherein:
    the output parameters are configured as at least one of a map displaying time-based locations of the goods along with the output parameters at the time-based locations and a data table of output parameters.

20. The method of claim 12, further comprising:
    displaying the output parameters as at least one of a map showing time-based locations of the goods along with the output parameters at the time-based locations and a data table of output parameters.

* * * * *